United States Patent Office 3,372,485
Patented Mar. 12, 1968

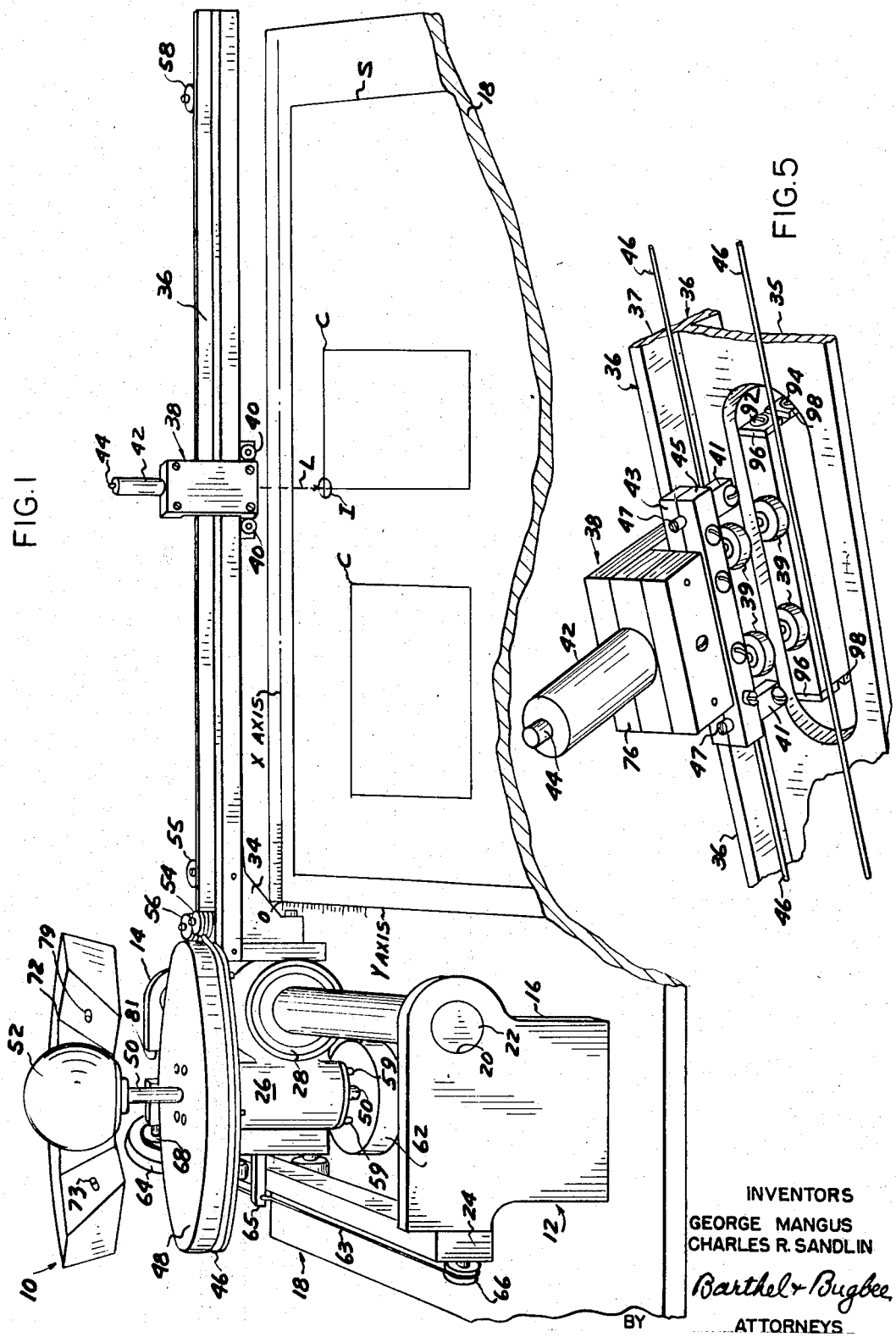

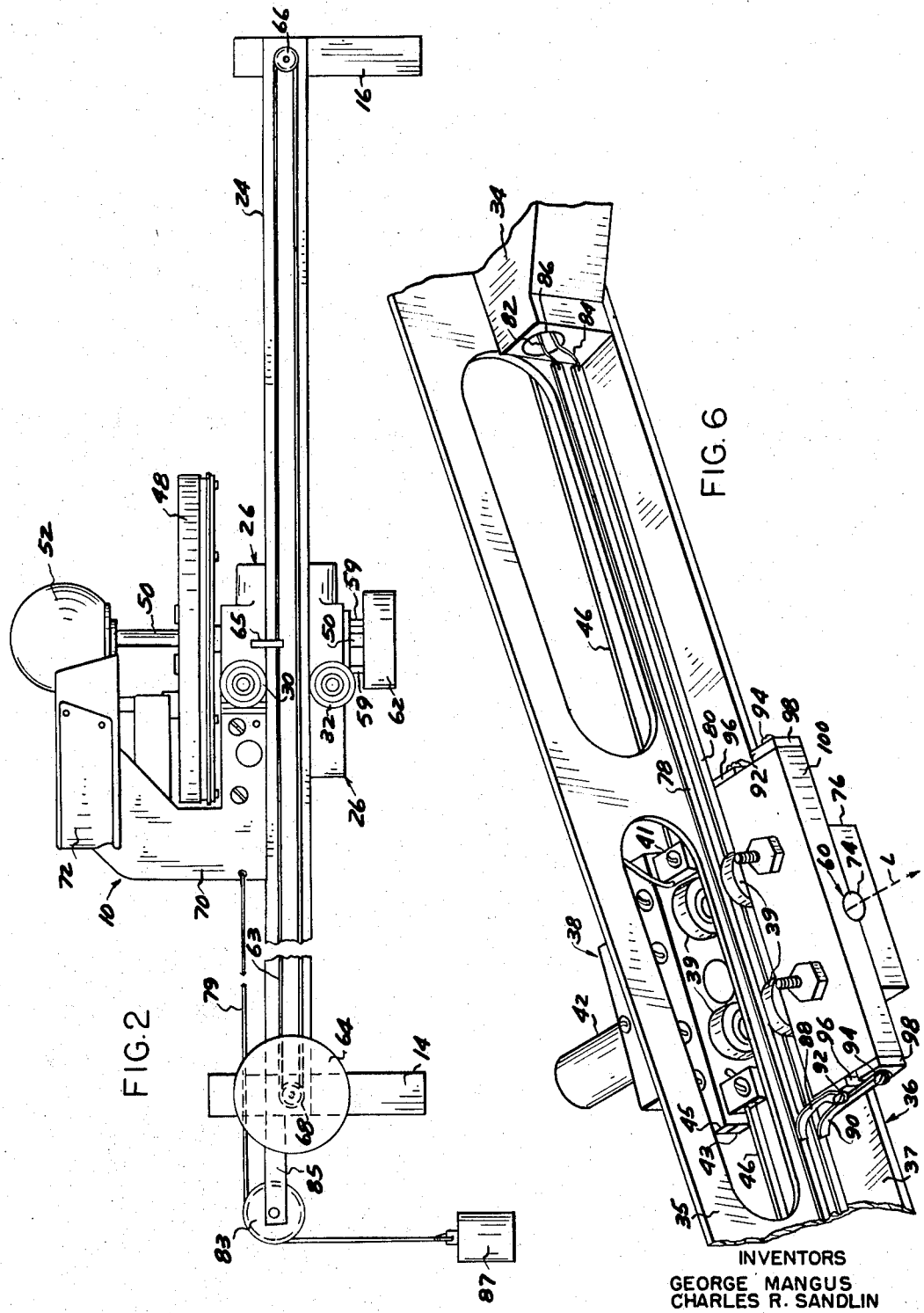

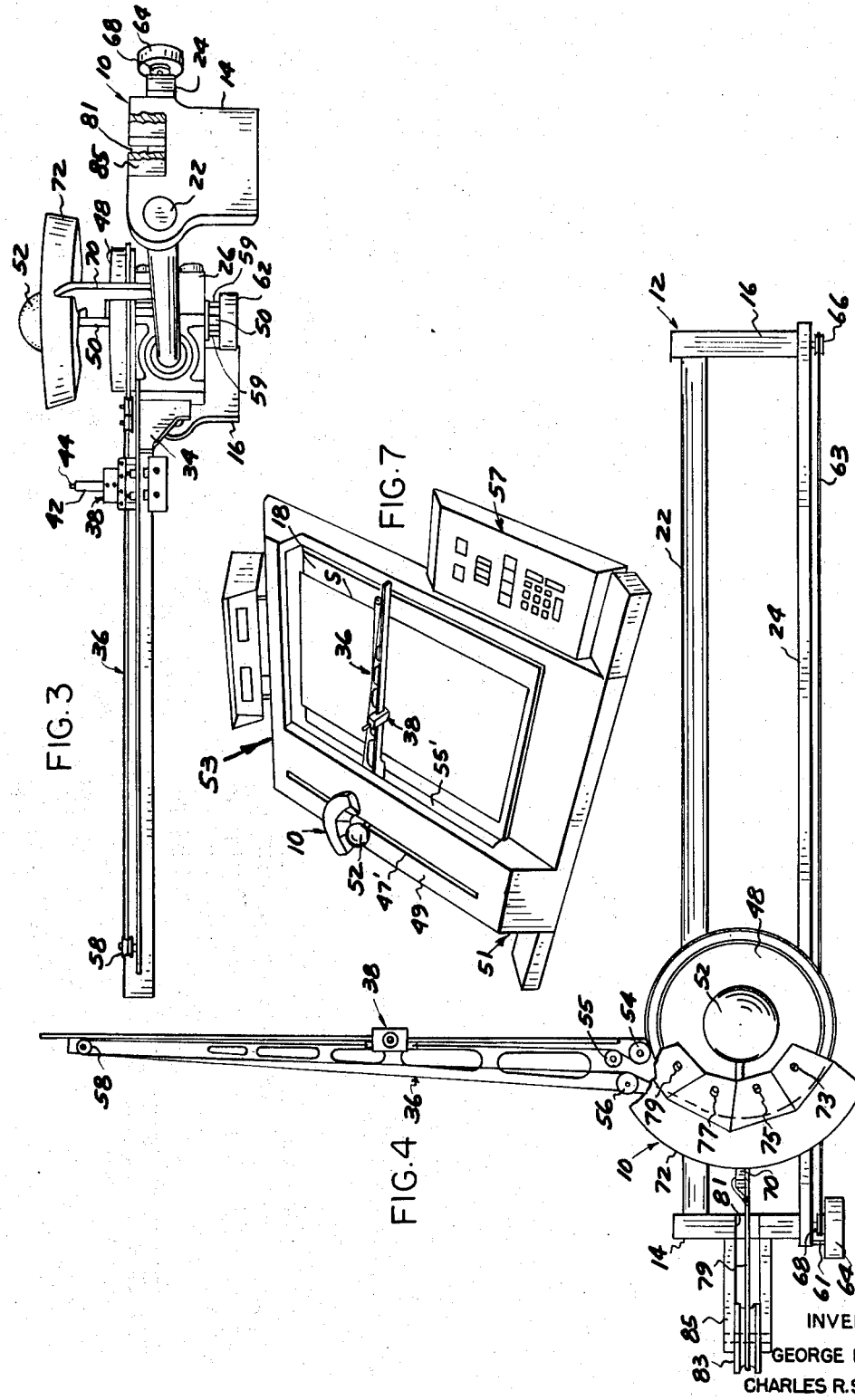

3,372,485
SCANNING INSTRUMENT
George Mangus and Charles R. Sandlin, Miami, Fla., assignors to The Miami Herald Publishing Co., Inc., Miami, Fla., a corporation of Florida
Filed May 10, 1965, Ser. No. 454,495
15 Claims. (Cl. 33—1)

This invention relates to data recording equipment and, in particular, to newspaper layout mark-up coordinate digitizers.

One object of this invention is to provide a scanning instrument for a layout mark-up coordinate digitizer which, with a minimum of fatigue to the operator, quickly and easily measures the locations of selected points on a layout sheet, such as of newspaper advertising, in terms of their rectangular coordinates measured in printer's points from a selected origin of coordinates and records upon code tape the X-axis and Y-axis coordinates of these selected points.

Another object is to provide a scanning instrument of the foregoing character which is operated and controlled with extreme rapidity yet requires only one hand of the operator, leaving his other hand free for making notes or other operations.

Another object is to provide a scanning instrument of the foregoing character, whereby the coordinates of selected points are measured by a stylus or illuminated cross hair image carried by a cross slide movable along a horizontal guide arm traveling at right angles to a carriage traveling along an upwardly-inclined guideway, the moving portions of the scanning instrument which extend over the advertising copy layout sheet under measurement being of minimal dimensions by a novel construction which gives adequate strength while interposing the minimum structure between the operator's eyes and the layout sheet.

Other objects and advantages of the invention will become apparent during the course of the following description of the accompanying drawing, wherein:

FIGURE 1 is a front elevation, slightly in perspective looking down from above, of a scanning instrument for an advertising layout mark-up coordinate digitizer, according to one form of the invention, as mounted upon a layout board;

FIGURE 2 is a left-hand side elevation of the scanning instrument shown in FIGURE 1, but with the layout board omitted;

FIGURE 3 is a rear elevation of the scanning instrument shown in FIGURES 1 and 2, upon a slightly reduced scale and slightly in perspective viewed from a position to the left, with the layout board also omitted;

FIGURE 4 is a top plan view of the advertising layout mark-up coordinate digitizer of identical construction to that shown in FIGURES 1, 2 and 3, but mounted in a position rotated 90 degrees counterclockwise from the position shown in FIGURES 1, 2 and 3, with the layout board also omitted;

FIGURE 5 is an enlarged fragmentary rear perspective view, looking downward from above at the cross slide and the adjacent portion of the cross arm;

FIGURE 6 is an enlarged fragmentary rear perspective view similar to FIGURE 5 but looking upward from below at the cross slide and adjacent portion of the cross arm; and FIGURE 7 is a front perspective view, on a reduced scale, of an advertising layout mark-up coordinate digitizer console equipped with the scanning instrument of FIGURES 1 to 6 inclusive.

Hitherto, it has been found desirable, particularly in the newspaper publishing industry, to measure and record the locations of certain selected points, such as the corners of advertising copy on newspaper layout page sheets, so that these measurements in terms of the rectangular coordinates of such points may be used to control the motions of a subsequently used photographic projector for photographically recording the advertising copy in the identical locations occupied on the layout page sheet. Such prior coordinate measuring instruments, however, have been mechanically complicated and structurally bulky, with the result that portions of them seriously obscured the layout copy being scanned and measured, and have been sluggish in operation as well as requiring both hands of the operator for their operation. The present invention provides a scanning instrument which eliminates these faults of prior instruments of this type and at the same time records upon record tape the X and Y coordinate measurements from a chosen origin of coordinates, in terms of 72-per-inch printer's points, of the desired locations, so that the tape may be used for subsequently controlling the motions of other machines, such as photographic projectors, tape-controlled reproduction machines and the like.

Referring to the drawings in detail, FIGURES 1, 2 and 3 show a scanning instrument, generally designated 10, according to one form of the invention, for recording the location of the corners or other desired points of advertising copy (C) upon a layout page sheet S (FIGURE 1). The scanning instrument includes a supporting structure 12 consisting of a pair of end plates or blocks 14 and 16 in spaced parallel relationship mounted near the top and bottom respectively of an inclined layout board 18. The latter is generally of aluminum with shallow ridges and with a vacuum pump connected thereto to hold the layout page sheet firmly against the board. Near their right-hand upper corners, the end plates 14 and 16 are bored coaxially at 20 to receive an inclined guide shaft 22, and near their upper left-hand corners the end plates are also interconnected by an inclined guide bar 24 bolted thereto in precise parallel relationship to the guide shaft 22.

Mounted upon the inclined guide shaft 22 and bar 24 for up-and-down reciprocation therealong is a carriage 26 having a bearing 28 engaging the guide shaft 22 and upper and lower anti-friction guide rollers 30 and 32 which engage the parallel upper and lower sides of the guide bar 24 and roll therealong (FIGURE 2).

Bolted to and extending horizontally to the right on the right-hand side of the carriage 26 is the supporting bracket 34 of a horizontal guide arm 36 of T-shaped cross-section with a generally horizontal tapered flange 35 and a generally vertical flange 37 (FIGURE 5) of rectangular cross-section with precisely machined parallel surfaces upon which a cross slide or traverse element 38 is slidably mounted for travel back and forth therealong on horizontal and vertical anti-friction bearing rollers 39 and 40 respectively. Mounted vertically upon the cross-slide 38 and above the flange 37 and slightly to one side of the guide arm flange 35 is a casing 42 which holds a spring (not shown) and reciprocally supports a spring-pressed plunger. On the lower end of the plunger 44 is mounted a downwardly-extending bearing roller assembly (not shown) which rolls along the top edge of the flange 37 of the guide arm 36 (FIGURE 5).

The cross slide or traverse element 38 (FIGURES 5 and 6) is moved back and forth along the guide arm 36 by being connected at anchorages 41 by screw-tightened clamping bars 43 and 45 with slack take-up pins 47 to the ends of a steel tape belt 46, the left-hand portion of which almost completely encircles a large pulley 48 drivingly connected to a nearly vertical shaft 50 journaled in the carriage 26. The shaft 50 passes upward through an elongated slot 47' in the top wall 49 of a housing 51

(FIGURE 7) of a console 53 with a main control switchboard 57. The shaft 50 at its upper end carries an operating ball 52 which is grasped by the operator. The housing 51 also has an elongated side slot 55' for the passage of the guide arm 36. The steel tape belt 46 passes between and around inner pulleys or rollers 54, 55 and 56 (FIGURES 1 and 4) along the guide arm 36 and around an outer pulley or roller 58, one course of the belt being anchored to the cross slide or traverse element 38. Consequently, when the operator rotates the ball 52 and consequently the shaft 50 and pulley 48, the resulting travel of the belt 46 moves the cross slide 38 back and forth along the arm 36 until an index pointer or indicator 60, described below, arrives at the location it is desired to register. Meanwhile, an X-axis encoder 62 mounted on studs 59 depending from the lower end of the carriage 26 and drivingly connected to the shaft 50 (FIGURES 1, 2 and 3) counts off the travel of the cross slide 38 in terms of printer's points from the origin 0 in the X-axis direction. This encoder 62 is connected electrically to the instrument circuit for producing the tape.

Similarly, the Y-axis motion of the carriage 26 along the guide shaft 22 and guide bar 24 is counted off by a Y-axis encoder 64 (FIGURES 1 and 4) mounted on studs 61 projecting forwardly from the guide bar 24 and operatively connected to the carriage 26 by a flexible wire cable 63, the opposite ends of which are connected to an arm 65 on the carriage 26, with the measurement also in terms of printer's points from the origin or zero mark 0 at the upper left-hand corner of the layout board 18. The encoder operating scale cable 63 at its forward end passes around an idler pulley 66 mounted on the forward end of the guide bar 24 and at its rearward end is wound around an encoder driving drum 68 drivingly connected to the drive shaft of the encoder 64.

An upstanding recessed bracket 70 is bolted at its lower end to the carriage 26 and also passes upwardly through the elongated slot 47. Mounted on the upper end of the bracket 70 is a hollow arcuate control switch station structure 72 containing four auxiliary push-button control switches 73, 75, 77, and 79. These switches are placed here because frequently used by the operator while manipulating the ball 52. Connected to the bracket 70 is one end of a wire cable 79 which passes through a notch 81 around a pulley 83 rotatably mounted on a bracket 85 bolted to the end plate 14. A counterweight 87 is connected to the other end of the cable 79.

The indicator 60 is a conventional optical cross-line projector mounted within the cross slide 38 and projecting a cross line image I upon the layout sheets from a light beam L passing downward through the objective lens of the projector mounted in the aperture 74 in the front plate 76 and block 100 of the cross slide 38. Electric current for producing the light beam is supplied through conductor rails 78 and 80 mounted on and insulated from the flange 35 of the arm 36 and connected by wires 82 and 84 passing through the hole 86 in the bracket 34 to a suitable source of current electricity. Contact with the rails 78 and 80 is made by sliders or brushes 88 and 90 anchored to terminals 92 and 94 in insulated bushings 96 and 98 mounted in block 100 bolted to the lower end of the cross slide 38. The terminals 92 and 94 are electrically connected to the projector bulb socket (not shown) containing the projector bulb (also not shown) within the cross slide 38.

In the operation of the invention, the operator sits in a chair in the front of the console 53 containing the layout board 18, with his newspaper page layout sheet S secured to the board 18 with his left arm resting upon the top wall 49 of the housing 51 and with his left hand grasping the ball 52. To register the X and Y coordinates upon the tape within the console 53, he simultaneously or successively rotates the ball 52 to move the indicator 60 in the X-axis or horizontal direction and pushes or pulls upon the knob 52 to move the carriage 26 with its arm 36 bodily in an upwardly or downwardly-inclined Y-axis direction until the indicator 60 arrives exactly over the location to be registered. Meanwhile, the encoders 62 and 64 have been counting off, but not recording the distances travelled by the indicator 60 along the X and Y axes, but indicating these distances in the windows of X and Y axis counters (not shown). To record the coordinates of a point, the operator then presses the pushbutton 73, concisely referred to as the "READ" pushbutton switch. This is a command switch which instantaneously impresses upon the tape, as by punching, the X and Y coordinates of the indicator 60. These counters and the tape-registering circuits connected to the X-axis and Y-axis encoders 62 and 64 are beyond the scope of the present invention.

The scanning instrument is also equipped with electric brakes (not shown) which will momentarily lock the carriage 26 and cross slide 38 in their attained positions while registration of their coordinate positions is being made on the tape. It also includes a conventional memory stage or buffer which stores the information momentarily. This allows the operator to move the scanner while data is recorded at slower speeds. Such memory stages, however, are conventional and form no part of the present invention.

What we claim is:

1. A scanning instrument for measuring and recording the locations of selected points in a copy layout in terms of their rectangular coordinate distances from an assumed origin, said instrument comprising a layout board having an origin of rectangular coordinates thereon and mutually perpendicular X and Y coordinate axis directions thereon intersecting at and proceeding from said origin, a supporting structure disposed adjacent said layout board and having an elongated rectilinear guideway at one side of the board disposed parallel to said Y-axis direction, a carriage mounted on said supporting structure and movable along said guideway parallel to said Y-axis direction, said carriage having an elongated guide member secured at one end to said carriage and projecting from said carriage over said layout board, said guide member having thereon an elongated rectilinear guideway disposed longitudinally thereof and parallel to said X-axis direction.

a cross-slide mounted on said guide member in guided sliding engagement with said longitudinal guideway, an indicating pointer mounted on said cross-slide with its axis directed downwardly therefrom toward said layout board, an operating handle rotatably mounted on said carriage and adapted when pushed and pulled to move said carriage and guide member bodily back and forth respectively along the first-named guideway, mechanism operatively connecting said handle to said cross-slide and responsive to the rotation of said handle for moving said cross slide and pointer to and fro along said longitudinal guideway, an encoder means responsive to the movements of said carriage and cross slide along their respective guideways for measuring and recording the distances along said X and Y axes from said origin to said pointer when moved into registry with selected points on said layout board brought into registry with said pointer by said movements of said carriage and cross slide respectively.

2. A scanning instrument, according to claim 1, wherein said encoder means includes an X-axis coordinate distance encoder mounted on said carriage and operatively connected to said handle.

3. A scanning instrument, according to claim 2, wherein a handle shaft is rotatably mounted on said carriage and operatively connected to said X-axis distance encoder and wherein said handle is drivingly connected to said shaft.

4. A scanning instrument, according to claim 3, wherein a driving wheel is mounted on said handle shaft and an idler wheel is mounted on said guide member remote from said driving wheel, and wherein an elongated flexible cross slide moving element is trained around said wheels and drivingly connected to said cross slide.

5. A scanning instrument, according to claim 1, wherein said indicating pointer comprises an electrically-energized optical indicating image projector arranged to project an illuminated image upon said layout board, and wherein means is provided for conducting electricity from said carriage along said guide member to said cross slide and projector.

6. A scanning instrument, according to claim 1, wherein said encoder means includes a Y-axis coordinate distance encoder operatively connected to said carriage and rotated in response to the travel of said carriage along the first-named guideway.

7. A scanning instrument, according to claim 6, wherein said Y-axis encoder is mounted upon said supporting structure and wherein carriage motion-transmitting means is operatively connected between said Y-axis encoder and said carriage.

8. A scanning instrument, according to claim 7, wherein said carriage motion-transmitting means includes an elongated endless flexible element disposed in an elongated path and connected to said carriage and a pair of flexible element supporting wheels mounted on said supporting structure at opposite ends of said path in supporting engagement with said flexible element, one of said wheels being drivingly connected to said Y-axis encoder.

9. A scanning instrument, according to claim 1, wherein an upstanding member is mounted on said carriage adjacent said handle, and wherein an arcuate control switch station structure is mounted on said upstanding member adjacent said handle.

10. A scanning instrument, according to claim 1, wherein said handle comprises a ball.

11. A scanning instrument, according to claim 10, wherein a handle shaft is rotatably mounted on said carriage with its axis directed upwardly, and wherein said ball is mounted on the upper end of said handle shaft.

12. A scanning instrument, according to claim 1, wherein said guide member comprises an arm of approximately T-shaped cross-section and wherein said cross slide carries cross slide guide rollers guidedly engaging with said arm.

13. A scanning instrument, according to claim 1, wherein said supporting structure includes a pair of spaced upstanding members and a pair of elongated transversely-spaced guide elements mounted on and interconnecting said upstanding members.

14. A scanning instrument, according to claim 13, wherein one of said guide elements has parallel upper and lower surfaces and wherein upper and lower carriage guide rollers are rotatably mounted on said carriage in rolling guided engagement with said upper and lower surfaces.

15. A scanning instrument, according to claim 1, wherein a housing is mounted over said supporting structure and carriage and has a top wall with an elongated opening disposed parallel to the first-named guideway, said operating handle being disposed above said top wall and connected to said carriage through said opening.

References Cited

UNITED STATES PATENTS

| | | | |
|---|---|---|---|
| 1,511,626 | 10/1924 | Marino. | |
| 2,566,247 | 8/1951 | Pierce et al. | 33—1 |
| 2,618,860 | 11/1952 | Engelhart | 33—1 X |
| 3,166,844 | 1/1965 | Pascoe et al. | 33—1 |
| 3,182,399 | 5/1965 | Price | 33—1 X |
| 3,209,996 | 10/1965 | Carson et al. | 33—1 X |
| 3,239,941 | 3/1966 | Ahmer | 33—1 X |
| 3,293,651 | 12/1966 | Gerber et al. | 33—1 X |

FOREIGN PATENTS 844,366  7/1952  Germany.

ROBERT B. HULL, *Primary Examiner.*